(12) United States Patent
Buerkle

(10) Patent No.: US 9,707,865 B1
(45) Date of Patent: Jul. 18, 2017

(54) OPERATOR SEAT SWIVEL WITH ARM RELEASE

(71) Applicant: Deere & Company, Moline, IL (US)

(72) Inventor: Bryan K. Buerkle, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/146,816

(22) Filed: May 4, 2016

(51) Int. Cl.
B60N 2/38 (2006.01)
B60N 2/04 (2006.01)
B60N 2/14 (2006.01)
A47C 7/54 (2006.01)
B60N 2/46 (2006.01)

(52) U.S. Cl.
CPC .............. B60N 2/14 (2013.01); B60N 2/38 (2013.01); B60N 2/4673 (2013.01)

(58) Field of Classification Search
CPC ........... B60N 2/14; B60N 2/38; B60N 2/4673
USPC ............ 297/344.21, 344.22, 344.23, 344.24, 297/344.25, 344.16, 411.31, 411.37
See application file for complete search history.

(56) References Cited

U.S. PATENT DOCUMENTS

| 4,730,691 A * | 3/1988 | Grigg | B60N 2/143 180/326 |
| 5,409,079 A * | 4/1995 | Strong | B60K 20/00 180/326 |
| 6,039,141 A * | 3/2000 | Denny | B60N 2/14 180/329 |
| 6,086,142 A * | 7/2000 | Simmons | B60N 2/146 297/344.26 X |
| 6,164,285 A * | 12/2000 | Garberg | B60K 20/00 180/324 |
| 6,550,560 B2 * | 4/2003 | Carleton | G05G 9/047 180/272 |
| 6,814,174 B2 * | 11/2004 | Fluent | B60N 2/14 297/344.22 X |
| 7,059,680 B2 * | 6/2006 | Billger | B60N 2/0224 297/344.21 X |
| 7,121,608 B2 * | 10/2006 | Billger | B60N 2/002 297/344.22 X |
| 7,350,866 B2 * | 4/2008 | Billger | B60N 2/0224 297/344.21 X |
| 7,520,567 B2 * | 4/2009 | Billger | A47C 3/18 297/344.22 X |
| 7,681,686 B1 * | 3/2010 | Klas | B60K 26/00 180/329 |
| 7,757,806 B2 * | 7/2010 | Bower | B60N 2/06 180/326 |
| 7,784,581 B1 * | 8/2010 | Klas | B60N 2/4693 297/344.21 X |

(Continued)

Primary Examiner — Rodney B White
(74) Attorney, Agent, or Firm — Lorenz & Kopf, LLP

(57) ABSTRACT

An operator seat for a work vehicle is disclosed. The operator seat includes an operator support rotatably mountable to the work vehicle and an arm coupled to the operator support to rotate with the operator support. The arm includes at least one human-machine interface device. The operator seat includes a hinge pivotally connecting the arm to the operator support, and a linkage having a first end and a second end. The first end is coupled to the operator support, and the linkage is configured such that rotation of the operator support in a first direction causes the second end of the linkage to move the arm in a second direction substantially opposite the first direction.

20 Claims, 7 Drawing Sheets

(56) References Cited

U.S. PATENT DOCUMENTS

| | | | | |
|---|---|---|---|---|
| 8,038,202 | B2* | 10/2011 | Ueda | B66C 13/56 |
| | | | | 296/190.01 |
| 8,210,613 | B2* | 7/2012 | Adelsperger | B60N 2/14 |
| | | | | 297/344.21 |
| 8,985,263 | B2* | 3/2015 | Peterson | E21F 13/025 |
| | | | | 180/317 |
| 9,057,221 | B2* | 6/2015 | Warr | E21B 7/02 |
| 9,592,758 | B2* | 3/2017 | Mahler | B60N 2/4633 |
| 2003/0230447 | A1* | 12/2003 | Wulfert | B60N 2/143 |
| | | | | 180/329 |
| 2004/0173409 | A1* | 9/2004 | Hock | B60N 2/0232 |
| | | | | 187/222 |
| 2004/0211616 | A1* | 10/2004 | Ueda | A47C 1/121 |
| | | | | 180/326 |
| 2005/0073184 | A1* | 4/2005 | Tsuji | B60N 2/501 |
| | | | | 297/284.1 |
| 2006/0000656 | A1* | 1/2006 | Bisick | B60N 2/4693 |
| | | | | 180/272 |
| 2007/0017728 | A1* | 1/2007 | Sano | B60N 2/4606 |
| | | | | 180/334 |
| 2009/0223734 | A1* | 9/2009 | Frett | B60N 2/4606 |
| | | | | 180/333 |
| 2011/0127819 | A1* | 6/2011 | Wada | B60N 2/06 |
| | | | | 297/344.1 |
| 2014/0273785 | A1 | 9/2014 | Guillory et al. | |

\* cited by examiner

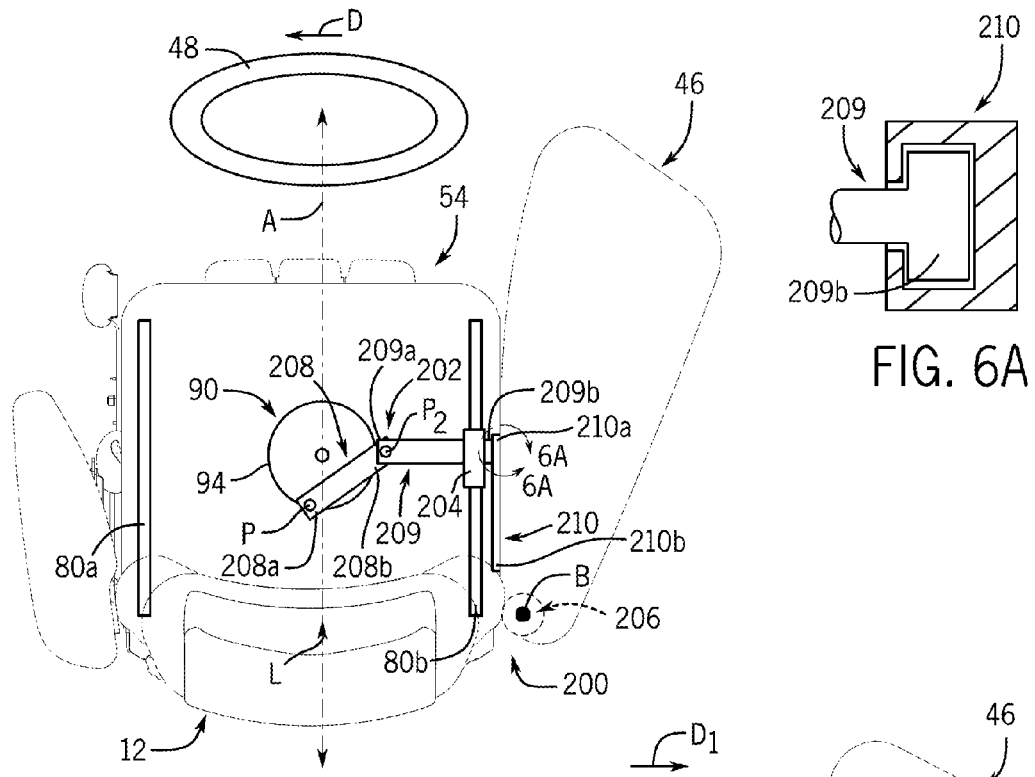
FIG. 6
FIG. 6A
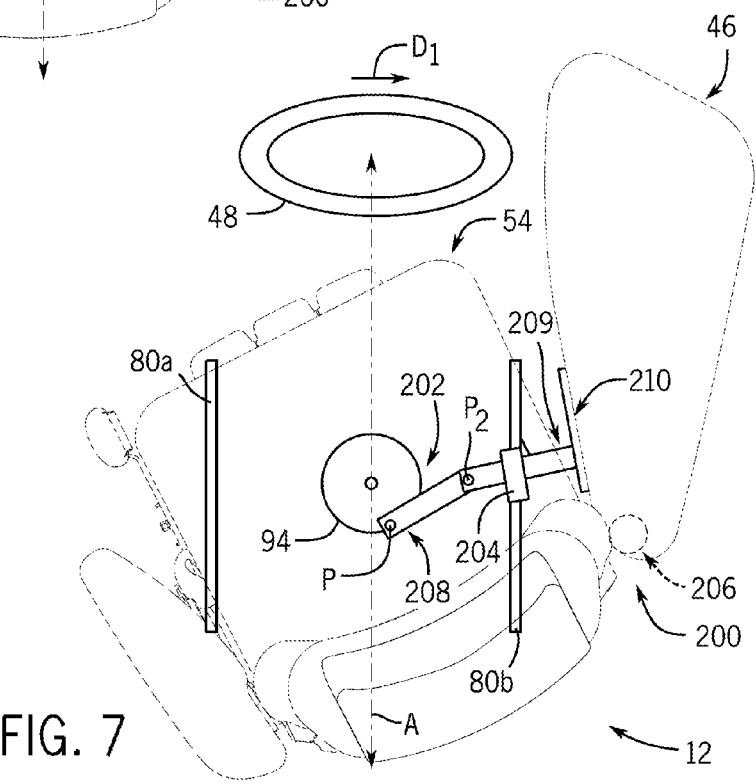
FIG. 7

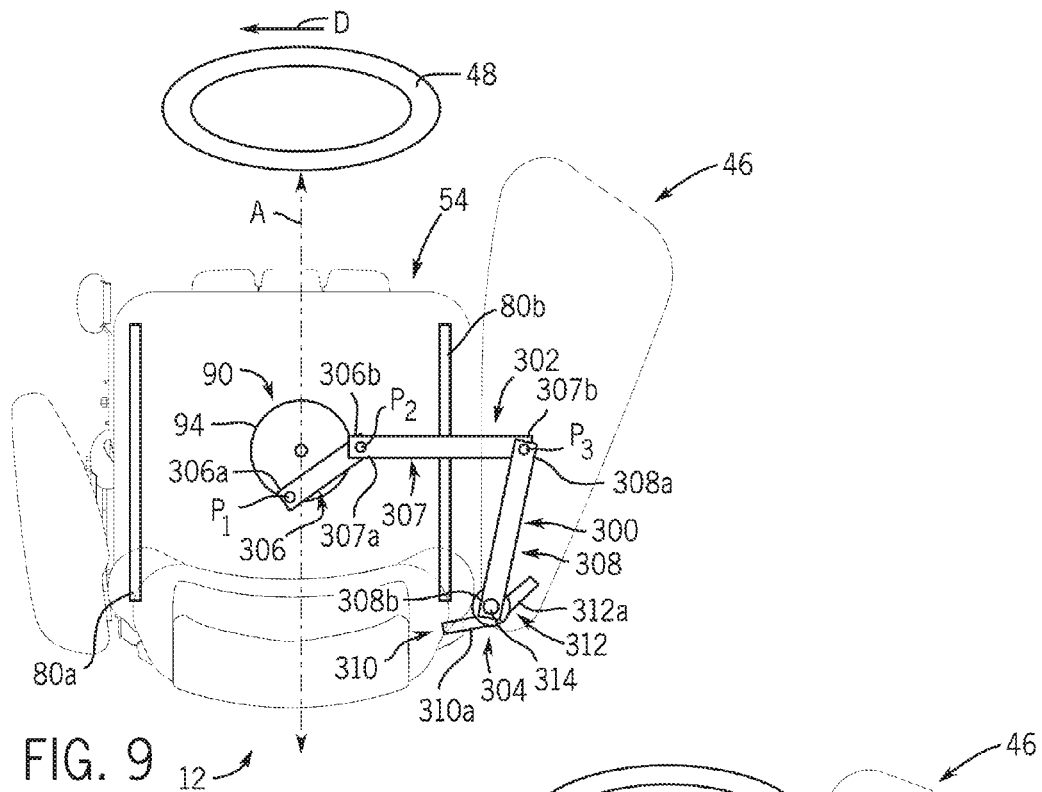
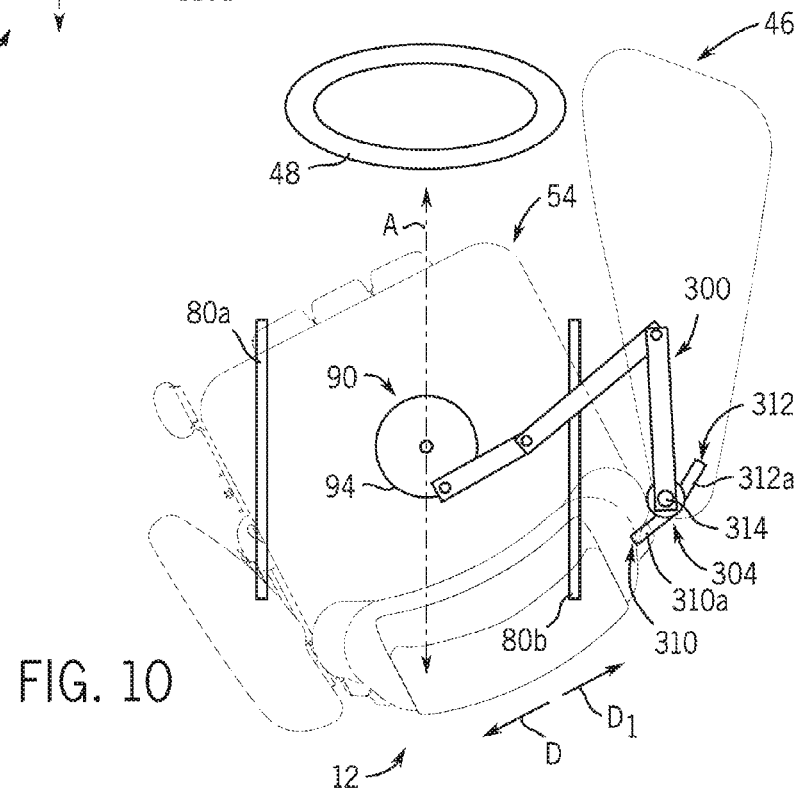

OPERATOR SEAT SWIVEL WITH ARM RELEASE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and to seats for operators of work vehicles with improved seat rotation or swivel.

BACKGROUND OF THE DISCLOSURE

Various work vehicles, such as tractors, include an operator station or cabin having a seating surface or seat for an operator. In certain instances, one or more arms of the seat may include operator controls, such as input devices, and optionally, may also include one or more operator displays. Generally, due to the nature of the operator controls and/or operator displays associated with the arm of the seat, the rotation or swivel of the seat is restricted to prevent collision between the operator controls and/or operator displays with a steering wheel or other operator controls within the cab of the work vehicle. The restriction of the movement of the seat may impede properly orienting the seat, and thus, reduce operator comfort and visibility to areas of interest (e.g., the ground, work implements and so on) during the operation of the work vehicle.

SUMMARY OF THE DISCLOSURE

The disclosure provides a system for an operator seat having improved rotation or swivel due to a release of an arm of the seat.

In one aspect the disclosure provides an operator seat for a work vehicle. The operator seat includes an operator support rotatably mountable to the work vehicle and an arm coupled to the operator support to rotate with the operator support. The arm includes at least one human-machine interface device. The operator seat includes a hinge pivotally connecting the arm to the operator support, and a linkage having a first end and a second end. The first end is coupled to the operator support, and the linkage is configured such that rotation of the operator support in a first direction causes the second end of the linkage to move the arm in a second direction substantially opposite the first direction.

In another aspect the disclosure provides an operator seat for a cab of a work vehicle, and the cab has one or more operator controls. The operator seat includes an operator support having a seat base mounted to the work vehicle and a seat bottom rotatably coupled to the seat base by a swivel assembly. The operator seat includes an arm coupled to the operator support to rotate with the operator support. The arm includes at least one human-machine interface device. The operator seat includes a hinge pivotally connecting the arm to the operator support. The operator seat includes a linkage having a first link coupled to the swivel assembly and a second link coupled to the first link. The linkage is configured such that rotation of the seat bottom in a first direction causes the first link and the second link to move the arm in a second direction substantially opposite the first direction to inhibit contact between the arm and the one or more operator controls.

The details of one or more embodiments are set forth in the accompanying drawings and the description below. Other features and advantages will become apparent from the description, the drawings, and the claims.

BRIEF DESCRIPTION OF THE DRAWINGS

FIG. 6 is a schematic view of the seat of FIG. 2, including an alternative arm release in a first position;

FIG. 6A is a schematic cross-sectional view of a portion of the arm release of FIG. 6, taken along line 6A-6A of FIG. 6;

FIG. 7 is a schematic view of the seat with the alternative arm release of FIG. 6 in a second position;

FIG. 9 is a schematic view of the seat of FIG. 2, including another alternative arm release in a first position; and FIG. 10 is a schematic view thereof in a second position.

Like reference symbols in the various drawings indicate like elements.

DETAILED DESCRIPTION

Figure 1:
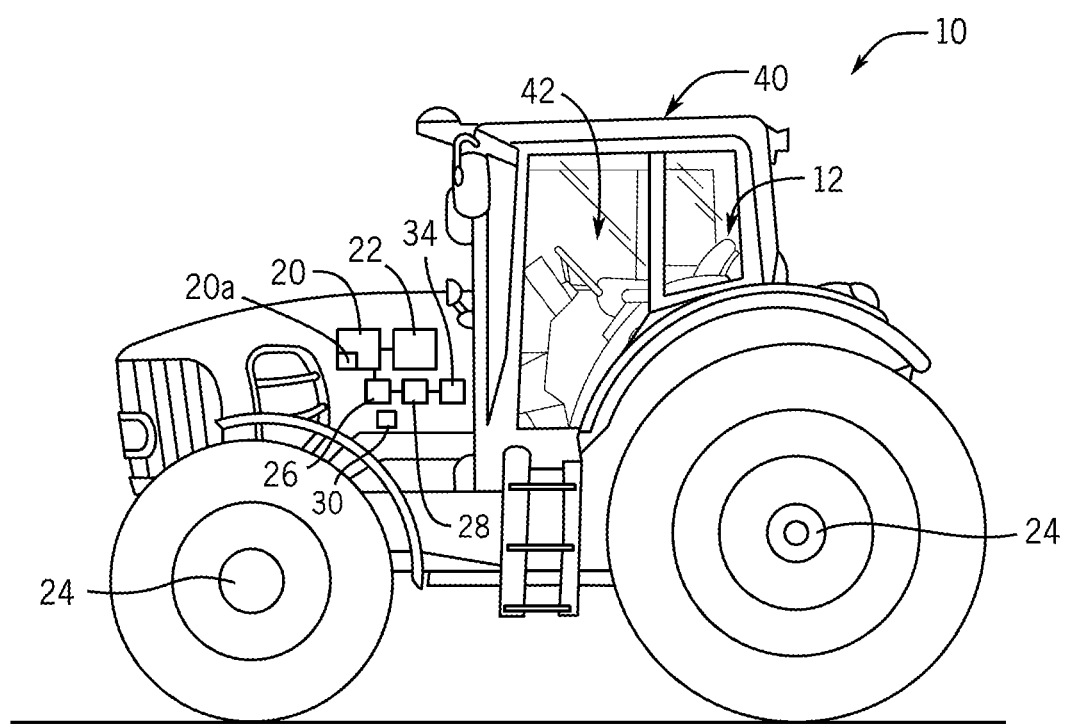
FIG. 1 is a perspective view of an example work vehicle in the form of a tractor, which includes an operator cabin with an operator seat having a seat swivel with arm release according to various embodiments of this disclosure.

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The following describes one or more example implementations of the disclosed system for a seat with an arm release for increased rotation or swivel, as shown in the accompanying figures of the drawings described briefly above. Generally, the disclosed systems (and work vehicles in which they are implemented) provide for the improved rotation of the seat of the work vehicle by releasing a command arm from the seat. In certain embodiments, the release of the command arm from the seat results in about an additional 15 degree to 30 degree improvement in rotation of the seat. By increasing the rotation angle of the seat, the operator is able to move to view the surrounding field with greater ease, thereby increasing operator comfort.

The following description relates to a work vehicle as a tractor. Discussion herein may sometimes focus on the example application of a tractor having a seat that has a releasable command arm. Generally, a command arm is an arm of the seat that has one or more input devices or displays that enable the operator to interface with the tractor. Thus, the command arm comprises part of the human-machine interface for the tractor. It should be noted, however, that the present disclosure is not limited to the release of a command arm, but rather, any arm of a seat may be released according to the present teachings to improve rotation of a seat. Moreover, the following description and illustrations refer to the command arm as being positioned on a right-hand side of an operator. In other applications, other configurations are also possible. Thus, the present disclosure is not limited to a right-hand positioned arm that is releasable from a seat, but rather, also encompasses a left-hand positioned arm. In addition, the teachings of the present disclosure can be applied to a seat having both a right-hand command arm and a left-hand command arm, if desired.

In the example of the present disclosure, the command arm is moved away from the seat in a direction that is substantially opposite a direction of rotation of the seat. Stated another way, as the seat rotates in a first direction, the command arm is moved in a second, opposite direction by an arm release system. By moving the command arm in the second, opposite direction, the command arm is prevented from contacting one or more instruments or operator controls associated with the tractor, such as a steering wheel, and thereby, enabling a further rotation of the seat. The arm release system includes a linkage having a first end coupled to a swivel assembly of the seat and a second end, such that rotation of the seat in a first direction causes the second end to move the command arm in a second, substantially opposite direction. The arm release system also includes a hinge, which couples the command arm to the seat such that the arm is movable relative to the seat. It will be understood, however, that the arm release system can be coupled to any portion of the seat that rotates with the operator. Moreover, the arm release system described herein utilizes a linkage to move the command arm away from the seat, however, any suitable device can be employed to move the command arm away from the seat, and the use of a linkage is merely exemplary.

As noted above, the system described herein may be employed with respect to a variety of work vehicles, including various agricultural or other work vehicles. In certain embodiments, the described system may be implemented with respect to a tractor. It will be understood, however, that the system disclosed herein may be used with various other work vehicles, such as a graders. Referring to FIG. 1, a work vehicle, such as a tractor 10, is shown. As will be discussed, the tractor 10 includes an operator support or seat 12, which has improved rotation or swivel due to a release of an arm associated with the seat 12.

The tractor 10 includes a source of propulsion, such as an engine 20. The engine 20 supplies power to a transmission 22. The transmission 22 transfers the power from the engine 20 to a suitable driveline coupled to one or more driven wheels 24 (and tires) of the tractor 10 to enable the tractor 10 to move. In one example, the engine 20 is an internal combustion engine, such as a diesel engine, that is controlled by an engine control module 20a. It should be noted that the use of an internal combustion engine is merely exemplary, as the propulsion device can be a fuel cell, electric motor, a hybrid-electric motor, etc.

The tractor 10 also includes one or more pumps 26, which may be driven by the engine 20 of the tractor 10. Flow from the pumps 26 may be routed through various control valves 28 and various conduits (e.g., flexible hoses) to control various components associated with the tractor 10. Flow from the pumps 26 may also power various other components of the tractor 10, such as one or more components associated with the seat 12. The flow from the pumps 26 may be controlled in various ways (e.g., through control of the various control valves 28 and/or a controller 30 associated with the tractor 10).

Generally, the controller 30 (or multiple controllers) may be provided, for control of various aspects of the operation of the tractor 10, in general. The controller 30 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 30 may be configured to execute various computational and control functionality with respect to the tractor 10 (or other machinery). In some embodiments, the controller 30 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 30 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 30 may be in electronic, hydraulic, mechanical, or other communication with various other systems or devices of the tractor 10 (or other machinery, such as an implement coupled to the tractor 10). For example, the controller 30 may be in electronic or hydraulic communication with various actuators, sensors, and other devices within (or outside of) the tractor 10, including various devices associated with the pumps 26, control valves 28, and so on. The controller 30 may communicate with other systems or devices (including other controllers, such as a controller associated with an implement) in various known ways, including via a CAN bus (not shown) of the tractor 10, via wireless or hydraulic communication means, or otherwise.

Various sensors may also be provided to observe various conditions associated with the tractor 10. In some embodiments, various sensors 34 (e.g., pressure, flow or other sensors) may be disposed near the pumps 26 and control valves 28, or elsewhere on the tractor 10. For example, sensors 34 observe a pressure associated with the pumps 26 and generate sensor signals based thereon.

Figure 2:
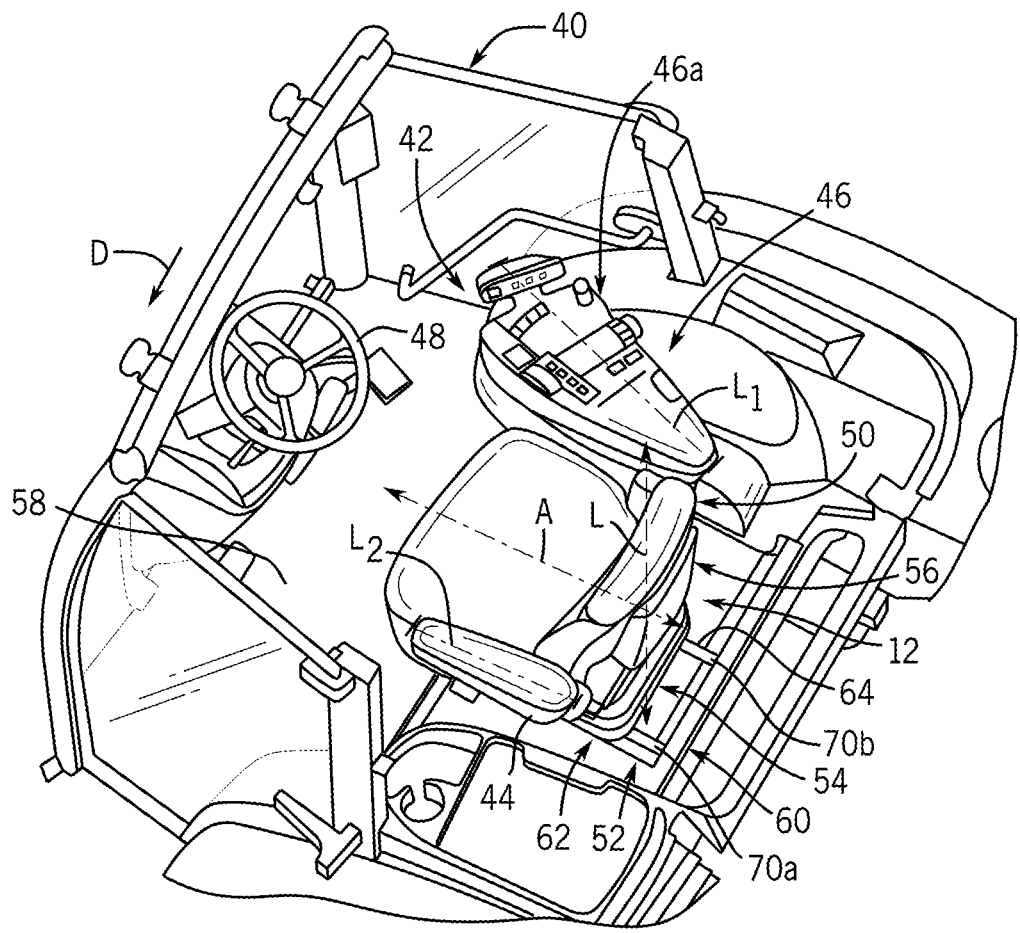
FIG. 2 is a perspective view of an interior of a cab of the work vehicle of FIG. 1, which illustrates the seat having a seat swivel with arm release.

With reference to FIG. 2, the tractor 10 includes a cab 40. The cab 40 includes a human-machine interface 42. The controller 30 receives input commands and interfaces with the operator via the human-machine interface 42. The human-machine interface 42 may be configured in a variety of ways. In some embodiments, the human-machine interface 42 may include one or more joysticks, various switches or levers, one or more buttons, a touchscreen interface that may be overlaid on a display, a keyboard, a speaker, a microphone associated with a speech recognition system, or various other human-machine interface devices. In this example, a portion of the human-machine interface 42 is coupled to the seat 12. In this example, the seat 12 includes a first seat arm 44 and a second, command arm 46. The command arm 46 includes one or more joysticks, levers, switches, buttons and optionally, one or more displays, generally indicated by reference numeral 46a, which enable the operator to interface with the controller 30 while seated in the seat 12. The human-machine interface 42 also includes one or more operator controls, such as a steering wheel 48, which is spaced apart from the seat 12 in the cab 40. It should be noted that the assembly of the second, command arm 46 on a right side of the operator (in a forward driving direction of the tractor 10) is merely exemplary, and that the following discussion can apply to a second, command arm 46 that is coupled to a left side of the operator. In the example of a left-hand placement for the second, command arm 46, it will be understood that the corresponding arm release system 50 would be reversed or a mirror image of the right-hand system discussed herein.

Due to the human-machine interface 42, the second, command arm 46 is generally larger than the first seat arm 44. In one example, the second, command arm 46 has a length L1, which is different than, and generally greater than, a length L2 of the first seat arm 44. As the second, command arm 46 is longer than the first seat arm 44, in order to swivel or rotate the seat 12 in a direction D that causes the second, command arm 46 to move towards the steering wheel 48, the seat 12 includes an arm release system 50. It should be noted that the assembly of the second, command arm 46 on a right side of the operator (in a forward driving direction of the tractor 10) is merely exemplary, and that the following discussion can apply to a second, command arm 46 that is coupled to a left side of the operator. In the example of a left-hand placement for the second, command arm 46, it will be understood that the corresponding arm release system 50 would be reversed or a mirror image of the right-hand system discussed herein.

In this regard, the seat 12 generally includes a seat base 52, a seat bottom 54 and a seat back 56. The seat base 52 is generally composed of a metal or metal alloy, and may include one or more coverings, such as paint, fabric, etc. to provide an aesthetically pleasing appearance and/or corrosion resistance. The seat base 52 is illustrated as being substantially rectangular; however, the seat base 52 can have any desired shape. The seat base 52 includes a first portion 60 and second portion 62. The first portion 60 is composed of one or more supports 64, which are each coupled to a floor 58 of the cab 40, via one or more mechanical fasteners, for example. Thus, the supports 64 can define one or more bores, which receive respective mechanical fasteners, such as bolts, screws, rivets, etc., to couple the first portion 60 to the floor 58.

The second portion 62 is movably coupled to the first portion 60. In one example, the second portion 62 is movable relative to the first portion 60 along a longitudinal axis L of the seat 12 to provide a seat height adjustment. For example, one or more scissor jacks can be positioned between the second portion 62 and the first portion 60 and actuated by a pedal 61 (FIG. 3) to raise or lower a height of the seat 12. In this example, the pedal 61 (FIG. 3) can be actuated to raise the seat 12, or can be released to lower the seat 12.

In certain embodiments, the seat base 52 comprises an active seat suspension, and includes one or more hydraulic cylinders that are responsive to one or more control signals from a controller to limit or dampen vertical movements of the seat 12. In the example of an active seat, one or more sensors, such as a position sensor and an accelerometer can also be coupled to the seat 12 to observe conditions of the seat 12 and generate sensor signals based thereon. The generated sensor signals can be communicated or transmitted to the controller over a communication architecture, such as the CAN bus, and the controller controls the hydraulic cylinder based on these signals. Alternatively, the seat 12 can comprise a semi-active seat, in which magnetorheological (MR) fluid in a damper is exposed to a variable magnetic field to vary a stiffness of the damper. A position sensor is also coupled to the seat 12 to observe conditions of the seat 12 and generate sensor signals based thereon. A controller receives the sensor signals and controls the magnetic field based on the received signals.

The second portion 62 also includes one or more first rails 70. In this example, the second portion 62 includes two first rails 70a, 70b, which extend along an axis A of the seat 12. The axis A is substantially transverse, and in this example, substantially perpendicular to a longitudinal axis L of the seat 12. The first rails 70a, 70b are spaced apart from each other about the axis A. The rails 70a, 70b are coupled, via one or more mechanical fasteners, for example, to the second portion 62.

Figure 3:
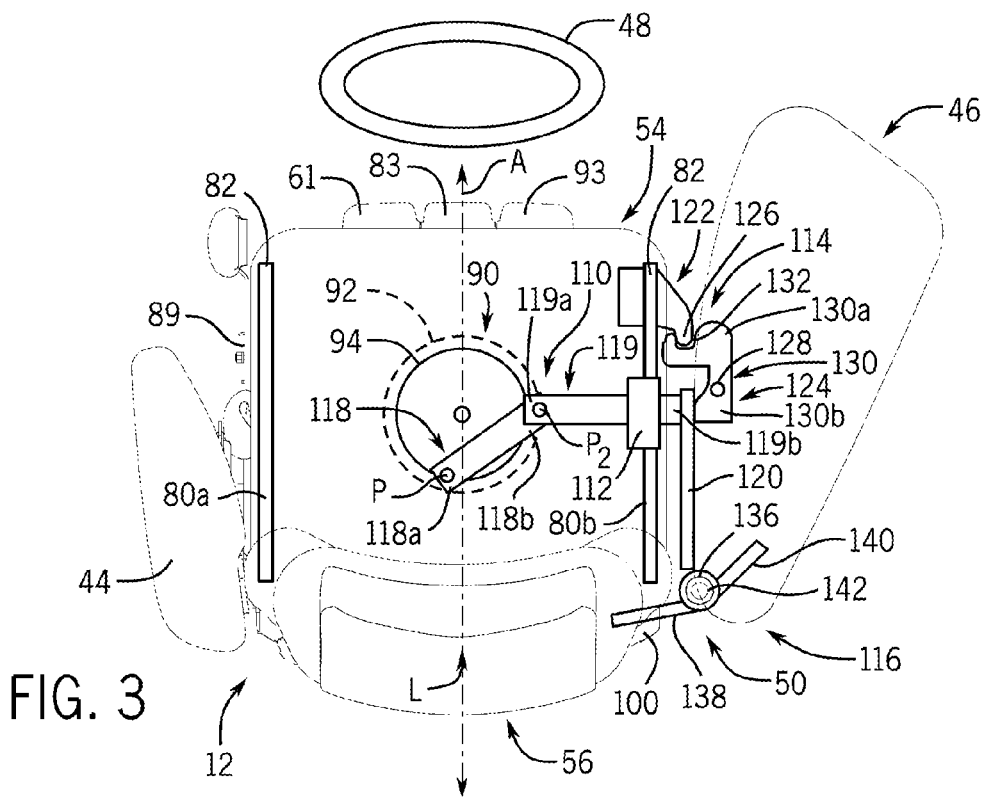
FIG. 3 is a schematic view of the seat of FIG. 2 with the arm release in a first position.

The second portion 62 is movably coupled to the seat bottom 54. In this example, the seat bottom 54 is movably coupled to the second portion 62 of the seat base 52 to define two degrees of motion. With reference to FIG. 3, the seat bottom 54 includes one or more second rails 80, which cooperate with the one or more first rails 70. In this example, the seat bottom 54 includes two second rails 80a, 80b. The second rails 80a, 80b are spaced apart from each other relative to the axis A. The rails 80a, 80b are generally rectangular, and each defines a slot 82. The slots 82 are slidably coupled to the first rails 70a, 70b and cooperate with the first rails 70a, 70b (FIG. 2) to enable the movement of the seat bottom 54 (and seat back 56) relative to the seat base 52 along the axis A. Thus, the first rails 70a, 70b and the second rails 80a, 80b enable a position of the seat 12 to be adjusted fore and aft relative to the steering wheel 48. In one example, each of the rails 70a, 70b include a plurality of detents, and the second rails 80a, 80b include at least one tab, which is receivable within a respective one of the plurality of detents to position the seat 12 in the desired fore/aft location. A pedal 83 be coupled to the second rails 80a, 80b and movable to cause the release of the at least one tab from the respective one of the plurality of detents, as is generally known.

The second portion 62 and the seat bottom 54 also include a swivel assembly 90. In this example, the swivel assembly 90 is coupled to the second portion 62 so as to be positioned between the second rails 80a, 80b. The position of the swivel assembly 90 between the second rails 80a, 80b facilitates the movement of the arm release system 50 relative to the seat bottom 54 as will be discussed in greater detail herein. The swivel assembly 90 enables the second portion 62 and the seat bottom 54 to swivel or rotate relative to the first portion 60 about the longitudinal axis L. In one example, the swivel assembly 90 comprises a first swivel plate 92, a second swivel plate 94 and a plurality of bearings. The first swivel plate 92 includes a plurality of tracks, which are defined about a circumference of the first swivel plate 92. The second swivel plate 94 includes a plurality of detents, which are arranged about a circumference of the second swivel plate 94. The plurality of detents cooperate with a pedal 93 to lock the rotation of the seat bottom 54 relative to the seat base 52. Stated another way, the pedal 93 is movable into a release position to enable a relative rotation or swivel of the seat bottom 54 and is movable into a lock position, in which a finger coupled to the pedal 93 engages a respective detent of the plurality of detents to lock the rotational position of the seat bottom 54 relative to the seat base 52. The second swivel plate 94 also defines a plurality of tracks about a perimeter of the second swivel plate 94. The plurality of tracks and the plurality of tracks cooperate to retain the plurality of bearings. In this regard, the plurality of bearings comprise individual balls that are movable about the plurality of tracks and the plurality of tracks to guide the seat bottom 54 during rotation relative to the seat base 52. The plurality of bearings can comprise any suitable spherical ball, and generally comprises a metal or metal alloy ball.

The seat bottom 54 is coupled to the seat base 52 and the seat back 54. The seat bottom 54 provides a seating surface for the operator, and can define a frame 89. The frame 89 can receive a seat cushion (not shown) to support the operator. The first seat arm 44 is also fixedly coupled to the frame 89, while the second, command arm 46 is movably or releasably coupled to the frame 89 by the arm release system 50. The second swivel plate 94 is coupled to the frame 89 of the seat bottom 54.

The seat back 54 provides back support for the operator, and is pivotally coupled to the frame 89 of the seat bottom 54. Generally, the seat back 54 includes a corresponding back frame 100. The back frame 100 receives padding, etc. and can include a covering, such as fabric, leather, etc. to provide a comfortable and aesthetically pleasing seating surface for the operator.

The arm release system 50 movably couples the second, command arm 46 to the seat bottom 54 of the seat 12, such that as the seat 12 moves, rotates or swivels, the second, command arm 46 is released to pivot such that the second, command arm 46 does not contact the steering wheel 48. While the second, command arm 46 is released and pivoted relative to the seat bottom 54, the second, command arm 46 remains coupled to the seat bottom 54. Thus, the arm release system 50 enables the second, command arm 46 to be released for rotation relative to the seat bottom 54, while remaining coupled to the seat bottom 54.

In one embodiment, the arm release system 50 includes a linkage 110, a bearing 112, a latch 114 and a hinge 116. The linkage 110 is coupled to the swivel assembly 90. In this example, the linkage 110 comprises two links: a first link 118 and a second link 119; however, any number of links can be employed. Generally, each of the first link 118 and the second 119 is composed of a metal or metal alloy, and is manufacturing by stamping, casting, machining, etc. It should be noted that the rectangular shape of the linkages 110 is merely exemplary, as the linkages 110 can have any desired shape, including, but not limited to, cylindrical. In this example, the first link 118 is coupled to the second swivel plate 94 of the swivel assembly 90 at a first end 118a via a pin P. The first link 118 is coupled to the second link 119 at a second, opposite end 118b via a second pin P2. The second link 119 is coupled to the first link 118 at a third end 119a, via the second pin P2; and has a fourth, opposite end 119b that is movable to contact the second, command arm 46. The pins P, P2 are generally cylindrical in shape, and are composed of a metal or metal alloy, such as stainless steel.

The linkage 110 is generally movable between a first position (FIG. 3), in which the first link 118 is substantially positioned within a perimeter defined by the seat bottom 54, a second position (FIG. 5) in which the second link 119 is extended beyond the perimeter to contact the second, command arm 46 and various positions in between. In this example, the second, command arm 46 includes a contact pad 120, which provides a contact surface for the fourth end 119b of the second link 119. Generally, the contact pad 120 is composed of a metal or metal alloy, and is formed by stamping, for example. The contact pad 120 can be coupled to the second, command arm 46 via mechanical fasteners, such as screws, bolts, and/or through an adhesive. As will be discussed, based on the rotation of the seat 12 in the direction D, the linkage 110 extends and the contact of the fourth end of the second link 119 can move the second, command arm 46 relative to the seat bottom 54.

Figure 5:
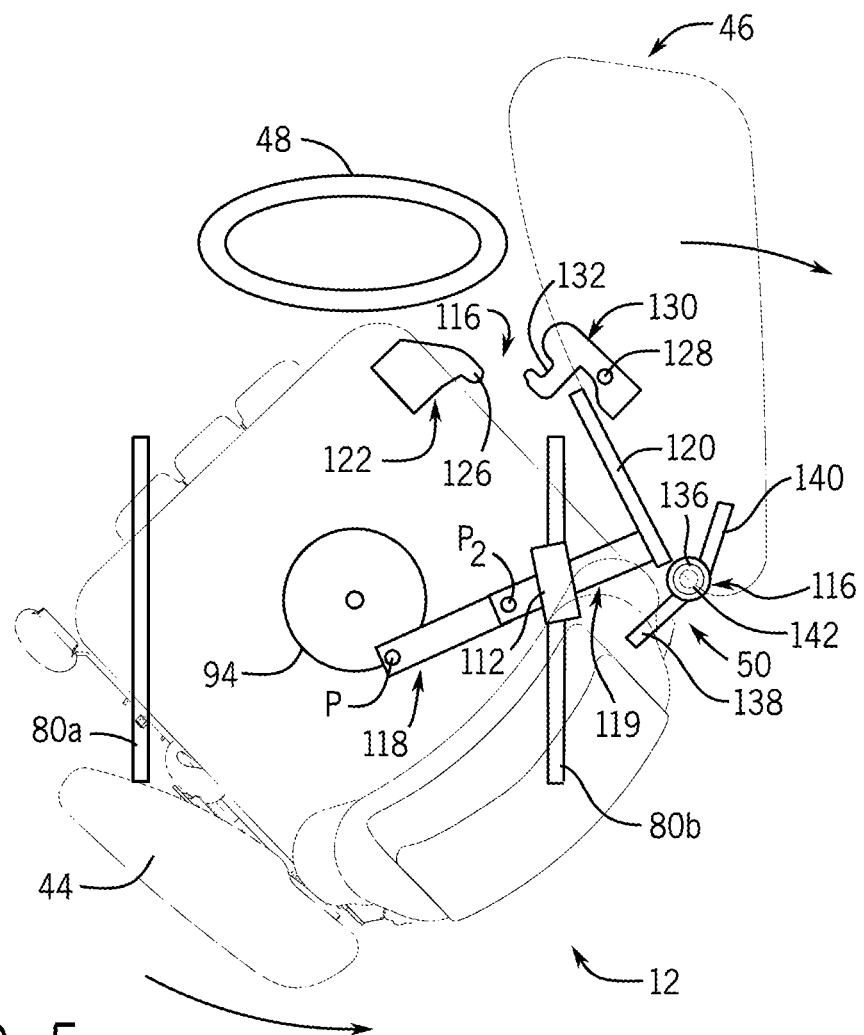
FIG. 5 is a schematic view of the seat of FIG. 2 with the arm release in a second position.

The bearing 112 is coupled to the one or more second rails 80 of the seat bottom 54. In the example of the second, command arm 46 coupled as a right arm of the seat 12, the bearing 112 is coupled to the second rail 80b via one or more mechanical fasteners, welding, adhesives, etc. The bearing 112 is sized to receive the second link 119 therethrough as the linkage 110 moves between the first position (FIG. 3) and the second position (FIG. 5). The bearing 112 is any suitable bearing 112, and in one example, comprises a ball bearing. The bearing 112 can optionally comprise a bushing, if desired. The bearing 112 guides the linear movement of the linkage 110 relative to the seat bottom 54 and the second, command arm 46.

The latch 114 releasably couples the second, command arm 46 to the seat bottom 54. In one example, the latch 114 comprises a catch 122 and a lever 124. In this example, the catch 122 is coupled to the seat bottom 54 and the lever 124 is coupled to the second, command arm 46. Each of the catch 122 and the lever 124 can be composed of a polymer, metal or metal alloy, which is stamped, machined, cast, etc. The catch 122 includes a tab 126, which extends in a direction towards the seat back 56 and is spaced apart from the seat bottom 54 to receive a portion of the lever 124. The catch 122 is coupled to the seat bottom 54 via any suitable technique, and in one example, is coupled to the seat bottom 54 via one or more mechanical fasteners, such as screws, bolts, etc.

The lever 124 is movably or pivotally coupled to the second, command arm 46, via pin 128, for example. The lever 124 includes a body 130, which defines a substantially U-shaped slot 132 at a first end 130a. The U-shaped slot 132 receives the tab 126 to hold the second, command arm 46 to the seat back 54. The pin 128 is received through the body 130 at a second end 130b. The lever 124 generally has any desired shape that enables the unlatching of the U-shaped slot 132 and the tab 126 upon the application of force to the contact pad 120 by the second link 119.

The hinge 116 couples the second, command arm 46 to the seat bottom 54. In one example, the hinge 116 comprises a spring-biased hinge, which includes a biasing member or spring 136, a first hinge portion 138, a second hinge portion 140 and a hinge pin 142. The spring 136 comprises any suitable biasing member, such as a torsion spring, which is composed of a metal or metal alloy. The spring 136 is coupled to each of the first hinge portion 138 and the second hinge portion 140 and generally biases the second, command arm 46 in a direction towards the seat bottom 54. Stated another way, the spring 136 biases the second, command arm 46 in a latched position. Generally, the spring 136 has a spring force that is selected to enable the second link 119 to overcome the spring force to unlatch the second, command arm 46 when the linkage 110 is in the second position, and to bias the second, command arm 46 back into the latched position such that the catch 122 and the lever 124 are engaged upon the movement of the linkage 110 to the first position. It should be noted that depending upon the selected strength of the spring 136, the latch 114 may be optional, as the spring 136 may apply a sufficient force to retain the second, command arm 46 adjacent to the seat bottom 54 in the first position. As a further alternative, the spring 136 can be positioned adjacent to the latch 114 to apply a biasing force on the second, command arm 46 in a direction towards the seat bottom 54.

The first hinge portion 138 is coupled to the seat bottom 54, and in one example, comprises a bracket, which defines at least one receptacle for the hinge pin 142. The first hinge portion 138 is coupled to the seat bottom 54 via one or more mechanical fasteners, such as screws, bolts, etc. The receptacle defined by the first hinge portion 138 cooperates with a corresponding receptacle defined by the second hinge portion 140 to receive the hinge pin 142 therethrough. The first hinge portion 138 and the second hinge portion 140 are each composed of a metal or metal alloy, and can be stamped, machined, cast, etc. The second hinge portion 140 also includes a bracket, which is coupled to the second, command arm 46. In one example, the bracket of the second hinge portion 140 is coupled to the second, command arm 46 via one or more mechanical fasteners, such as screws, bolts, etc. The hinge pin 142 is received through the receptacles defined by the first hinge portion 138 and the second hinge portion 140 to enable the second, command arm 46 to move or pivot relative to the seat bottom 54.

In order to assemble the seat 12, in one example, the seat base 52 assembled and coupled to the floor 58. The second swivel plate 94 and the rails 80a, 80b are coupled to the frame 89 of the seat bottom 54, and the second swivel plate 94 is coupled to the first swivel plate 92, while the second rails 80a, 80b are coupled to the first rails 70a, 70b. The seat back 56 is coupled to the frame 89, and the first seat arm 44 is coupled to the frame 89. The first hinge portion 138 is coupled to the frame 89, and the second hinge portion 140 is coupled to the second, command arm 46. The hinge pin 142 is received through the first hinge portion 138 and the second hinge portion 140 to assemble the hinge 116, and the spring 136 can be coupled to the hinge pin 142. The lever 124 of the latch 114 is coupled to the second, command arm 46 and the contact pad 120 is coupled to the second, command arm 46. The catch 122 is coupled to the frame 89, and the first link 118 is coupled to the second swivel plate 94 via the pin P. The bearing 112 is coupled to the second rail 80b, and the second link 119 is positioned through the bearing 112 and coupled to the first link 118 via the second pin P2.

Figure 4:
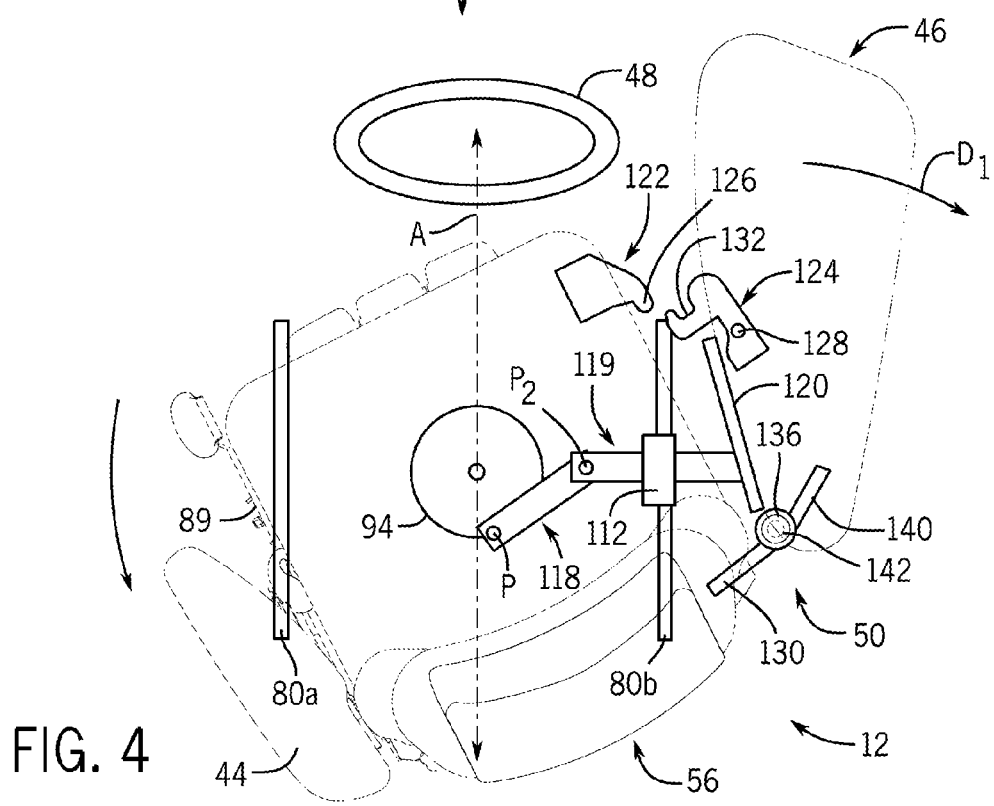
FIG. 4 is a schematic view of the seat of FIG. 2 with the arm release in an intermediate position.

With the seat 12 assembled, the operator can sit on the seating surface defined by the seat bottom 54. With the seat 12 in a first position, such that the seat bottom 54 is aligned with the axis A (FIG. 3), the latch 114 is coupled to the second, command arm 46 and the linkage 110 is in the first position. As the operator rotates the seat bottom 54 in the direction D, the first link 118 moves with the second swivel plate 94 of the swivel assembly 90, causing a corresponding movement of the second link 119. The second link 119 moves linearly through the bearing 112, and with the continued rotation of the seat bottom 54 in the direction D, the second link 119 contacts the contact pad 120. The continued contact between the second link 119 and the contact pad 120 overcomes the force of the spring 136, causing the lever 124 to move and unlatch the latch 114. The unlatching of the latch 114 releases the second, command arm 46 from the seat bottom 54, thereby allowing the second, command arm 46 to move in a direction D1 opposite the direction D (FIG. 4), to avoid contact between the second, command arm 46 and the steering wheel 48 (FIG. 5).

When the seat bottom 54 is moved back towards the axis A, the linkage 110 moves with the swivel assembly 90 toward the first position. As the linkage 110 moves toward the first position, the second link 119 is retracted into the seat bottom 54, and the spring 136 biases the second, command arm 46 towards the seat bottom 54. Once the linkage 110 is in the first position (FIG. 3), the force of the spring 136 causes the U-shaped slot 132 to engage the tab 126, and latches the latch 114 to secure the second, command arm 46 to the seat bottom 54.

It will be appreciated that the arm release system 50 can be configured in a different manner to achieve the desired movement of the second, command arm 46 during rotation or swiveling of the seat 12. In this regard, with reference to FIG. 6, an arm release system 200 for use with the seat 12 is shown. As the arm release system 200 is similar to the arm release system 50, the same reference numerals will be used to denote the same or substantially similar components.

The arm release system 200 movably couples the second, command arm 46 to the seat bottom 54 of the seat 12, such that as the seat 12 moves or rotates, the second, command arm 46 is released to pivot such that the second, command arm 46 does not contact the steering wheel 48 (FIG. 7). While the second, command arm 46 is released and pivoted relative to the seat bottom 54, the second, command arm 46 remains coupled to the seat bottom 54. Thus, the arm release system 200 also enables the second, command arm 46 to be released for rotation relative to the seat bottom 54, while remaining coupled to the seat bottom 54. It should be noted that the assembly of the second, command arm 46 on a right side of the operator (in a forward driving direction of the tractor 10) is merely exemplary, and that the following discussion can apply to a second, command arm 46 that is coupled to a left side of the operator. In the example of a left-hand placement for the second, command arm 46, it will be understood that the corresponding arm release system 200 would be reversed or a mirror image of the right-hand system discussed herein.

In one embodiment, the arm release system 200 includes a linkage 202, a bushing 204 and a hinge 206. The linkage 202 is coupled to the swivel assembly 90. In this example, the linkage 202 comprises two links: a first link 208 and a second link 209; however, any number of links can be employed. Generally, each of the first link 208 and the second link 209 is composed of a metal or metal alloy, and is manufacturing by stamping, casting, machining, etc. It should be noted that the rectangular shape of the linkages 202 is merely exemplary, as the linkages 202 can have any desired shape, including, but not limited to, cylindrical. In this example, the first link 208 is coupled to the second swivel plate 94 of the swivel assembly 90 at a first end 208a via the pin P. The first link 208 is coupled to the second link 209 at a second, opposite end 208a via the second pin P2. The second link 209 is coupled to the first link 208 at a third end 209a, via the second pin P2; and has a fourth, opposite end 209b that is coupled to the second, command arm 46. In one example, with reference to FIG. 6A, the fourth end 209b of the second link 209 has a T-shape and cooperates with a rail 210 coupled to the second, command arm 46. The rail 210 is generally C-shaped, and slidably receives the fourth end 209b of the second link 209. In certain instances, the rail 210 is open at ends 210a, 210b to enable the assembly of the fourth end 209b of the second link 209 to the rail 210. The rail 210 is composed of a metal or a metal alloy, and can be stamped, machined, cast, etc. The rail 210 is coupled to the second, command arm 46 via any desired technique, and in one example is coupled to the second, command arm 46 via one or more mechanical fasteners, such as screws, bolts, rivets, etc. Due to the shape of the fourth end 209b of the second link 209 and the engagement of the fourth end 209b with the rail 210, the linkage 202 moves the second, command arm 46 between a first position, as shown in FIG. 6, and a second position, as shown in FIG. 7, and various positions in between based on the rotation of the swivel assembly 90. Thus, the linkage 202 is generally movable by the swivel assembly 90 between a first position, in which the first link 208 and the second link 209 are substantially positioned within a perimeter defined by the seat bottom 54 (FIG. 6), a second position in which the second link 209 is extended beyond the perimeter to move the second, command arm 46 away from the seat bottom 54 (FIG. 7) and various positions in between.

The bushing 204 is coupled to the one or more second rails 80 of the seat bottom 54. In the example of the second, command arm 46 coupled as a right arm of the seat 12, the bushing 204 is coupled to the second rail 80b. The bushing 204 is sized to receive the second link 209 therethrough as the linkage 202 moves between the first position and the second position. The bushing 204 is any suitable bushing 204, and in one example, comprises an orbital motion bushing. It should be noted that the bushing 204 can alternatively comprise an orbital motion bearing. By using an orbital motion bushing, the bushing 204 is able to twist to accommodate the translational motion of the fourth end 209b in the rail 210. Thus, the bushing 204 guides the translational movement of the linkage 202 relative to the seat bottom 54 and the rail 210 of the second, command arm 46.

The hinge 206 couples the second, command arm 46 to the seat bottom 54. In one example, with reference to FIG. 8, the hinge 206 comprises a ramp detent hinge, which includes a biasing member or spring 220, a first hinge portion 222, a second hinge portion 224, a detent 226 and a hinge pin 228. The spring 220 comprises any suitable biasing member, such as an extension or compression coil spring, which is generally composed of a metal or metal alloy. The spring 220 is coupled to the hinge pin 228 and generally provides a biasing force that resists the motion of the first hinge portion 222 and the second hinge portion 224 relative to the detent 226. Stated another way, a force exerted by the spring 220 has to be overcome to move the first hinge portion 222 and/or second hinge portion 224 relative to the detent 226. Generally, the force of the spring 220 is selected to enable the second link 209 to overcome the spring force to move the second, command arm 46 when the linkage 202 is moved between the first position (FIG. 6) and the second position (FIG. 7).

The first hinge portion 222 is coupled to the second, command arm 46. In one example, the first hinge portion 222 is composed of a metal or metal alloy, and includes a bracket or flange 222a to assist in coupling the first hinge portion 222 to the second, command arm 46. In one example, the first hinge portion 222 is coupled to the second, command arm 46 via welding. It should be noted, however, that one or more mechanical fasteners can also be used to couple the first hinge portion 222 to the second, command arm 46. The first hinge portion 222 includes a cylindrical body 230, which defines a bore 232 and a plurality of teeth 234. The bore 232 extends along an axis B, which is substantially parallel with the longitudinal axis L of the seat 12 (FIG. 6). The bore 232 receives a portion of the hinge pin 228. The plurality of teeth 234 are defined about a perimeter or circumference of the bore 232 at an end 230a of the body 230. Each of the plurality of teeth 234 includes a ramp surface 236 and a wall 238. The ramp surface 236 cooperates with a corresponding ramp surface 250 defined on the detent 226 to enable the movement of the second, command arm 46 relative to the seat bottom 54. The wall 238 limits the rotation of the first hinge portion 222. Stated another way, the wall 238 defines a direction for the movement or rotation of the first hinge portion 222 by preventing the first hinge portion 222 from rotating in the direction of the wall 238.

The second hinge portion 224 is coupled to the seat bottom 54. In one example, the second hinge portion 224 is composed of a metal or metal alloy, and includes a bracket or flange 224a to assist in coupling the second hinge portion 224 to the seat bottom 54. In one example, the second hinge portion 224 is coupled to the seat bottom 54 via welding. It should be noted, however, that one or more mechanical fasteners can also be used to couple the second hinge portion 224 to the seat bottom 54. The second hinge portion 224 includes a cylindrical body 240, which defines a bore 242 and a plurality of teeth 244. The bore 242 extends along the axis B so as to be coaxial with the bore 232 for receipt of the hinge pin 228. The bore 242 receives a portion of the hinge pin 228. The plurality of teeth 244 are defined about a perimeter or circumference of the bore 242 at an end of the body 240. Each of the plurality of teeth 244 includes a ramp surface 246 and a wall 248. The ramp surface 246 cooperates with a corresponding second ramp surface 252 defined on the detent 226 to enable the movement of the second, command arm 46 relative to the seat bottom 54. The wall 248 limits the rotation of the second hinge portion 224. Stated another way, the wall 248 defines a direction for the movement or rotation of the second hinge portion 224 by preventing the second hinge portion 224 from rotating in the direction of the wall 248.

The detent 226 defines a first plurality of detent teeth 254 and a second plurality of detent teeth 256. The first plurality of detent teeth 254 are defined at a first end 226a, and the second plurality of detent teeth 256 are defined at a second, opposite end 226b. The first plurality of detent teeth 254 includes the ramp surface 250 and a wall 258. The ramp surface 250 cooperates with the ramp surface 236 to enable the rotation of the second, command arm 46 relative to the seat bottom 54. The wall 258 prevents the rotation of the plurality of teeth 234 in a counterclockwise direction.

The second plurality of detent teeth 256 includes the second ramp surface 252 and a second wall 260. The second ramp surface 252 cooperates with the ramp surface 246 to enable the rotation of the second, command arm 46 relative to the seat bottom 54. The second wall 260 prevents the rotation of the plurality of teeth 244 in a clockwise direction. It should be noted that the use of clockwise and counterclockwise herein is merely exemplary, and generally, the wall 258 prevents the rotation of the plurality of teeth 234 in a first direction, and the second wall 260 prevents the rotation of the plurality of teeth 244 in a second direction, which is opposite the first direction.

The detent 226 also defines a bore 264, which extends through the detent 226 from the first end 226a to the second end 226b. The bore 264 cooperates with the bore 232 and the bore 242 to receive the hinge pin 228, and thus, the bore 264 is coaxial the bore 232 and the bore 242.

The hinge pin 228 is received through the bore 232, the bore 242 and the bore 264, so as to extend along the axis B. The hinge pin 228 includes a first end 270 and a second, opposite end 272. The first end 270 includes a spring seat 270a, which cooperates with the spring 220 to retain the spring 220 between the first end 270 and the first hinge portion 222. The second end 272 extends beyond the bore 264 and is retained within the bore 232, the bore 242 and the bore 264 via a retaining pin 274, which is received through a bore 228a defined through the hinge pin 228. The bore 228a is generally defined so as to be substantially perpendicular to the axis B. The retaining pin 274 is generally press-fit through the bore 228a to securely couple the hinge pin 228 to the hinge 206. It should be noted that the use of a retaining pin 274 is merely exemplary, as the hinge pin 228 can be coupled to the hinge 206 in various ways, and for example, the hinge pin 228 can define a plurality of threads that receive a nut to couple the hinge pin 228 to the hinge 206.

With reference to FIG. 6, in order to assemble the arm release system 200, with the seat 12 assembled, in one example, the first hinge portion 222 is fixedly coupled to the second, command arm 46 and the second hinge portion 224 is fixedly coupled to the seat bottom 54. With the detent 226 positioned between the first hinge portion 222 and the second hinge portion 224, the spring 220 is coupled to the hinge pin 228, and the hinge pin 228 is inserted into the bore 232, the bore 242 and the bore 264 such that the spring 220 is coupled between the first end 270 of the hinge pin 228 and the first hinge portion 222. The retaining pin 274 is received through the bore 228a, and couples the hinge pin 228 to the first hinge portion 222, the detent 226 and the second hinge portion 224. The linkage 202 can be coupled to the swivel assembly 90 such that the first link 208 is coupled to the second swivel plate 94 via the pin P. The second link 209 can be slid into engagement with the rail 210 such that the fourth end 209b of the second link 209 is coupled to the rail 210. The bushing 204 is coupled to the rail 80b, and the third end 209a of the second link 209 can be received through the bushing 204. The first link 208 is coupled to the second link 209 via the second pin P2 to assemble the linkage 202.

Figure 8:
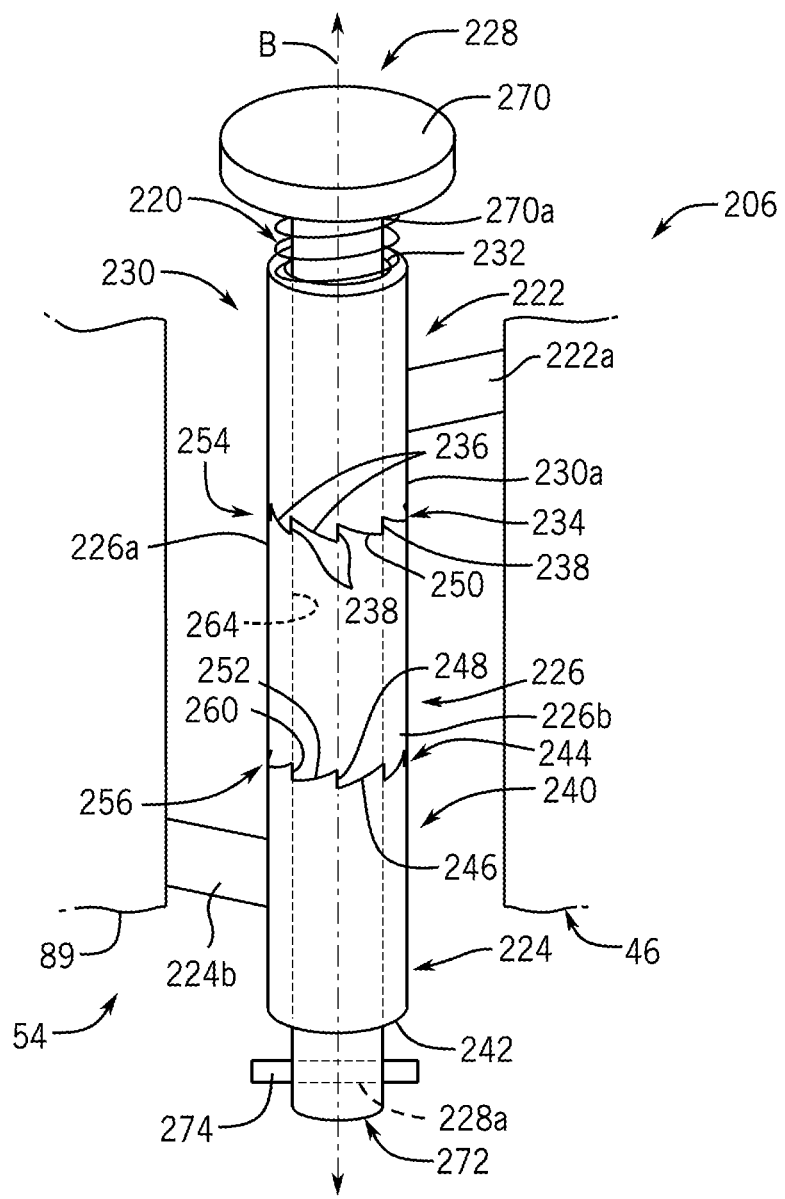
FIG. 8 is a schematic perspective view of a hinge for the arm release of FIG. 6.

With the arm release system 200 assembled, the operator can sit on the seating surface defined by the seat bottom 54. With the seat 12 in the first position, such that the seat bottom 54 is aligned with the axis A, the linkage 202 is in the first position (FIG. 6). As the operator rotates the seat bottom 54 in the direction D, the first link 208 moves with the swivel assembly 90, causing a corresponding movement of the second link 209 through the bushing 204 and within the rail 210. The movement of the second link 209 within the rail 210 applies a force against the second, command arm 46. The force applied by the second link 209 overcomes the force of the spring 220 and causes the rotation of the first hinge portion 222 relative to the detent 226, which moves the second, command arm 46 away from the seat bottom 54 (in a direction D1 generally opposite the direction D). The continued rotation of the seat bottom 54 causes the continued incremental rotation of the second, command arm 46. In this regard, each time the force of the spring 220 is overcome, the ramp surface 236 slides over the ramp surface 250, incrementally moving the second, command arm 46 away from the seat bottom 54 (FIG. 8). The wall 238 (FIG. 8) prevents the rotation of the second, command arm 46 in the opposite direction.

When the seat bottom 54 is moved back towards the axis A, the linkage 202 moves with the second swivel plate 94 of the swivel assembly 90 toward the first position. As the linkage 202 moves toward the first position, the second link 209 is retracted into the seat bottom 54, which causes the fourth end 209b of the second link 209 to apply a pulling force against the rail 210. The pulling force applied by the second link 209 overcomes the force of the spring 220, and causes a rotation of the second hinge portion 224 relative to the detent 226 (FIG. 8). The rotation of the second hinge portion 224 relative to the detent 226 moves the second, command arm 46 towards the seat bottom 54. The continued rotation of the seat bottom 54 towards the axis A causes the continued incremental rotation of the second, command arm 46 towards the seat bottom 54. In this regard, each time the force of the spring 220 is overcome, the ramp surface 246 slides over the second ramp surface 252, incrementally moving the second, command arm 46 toward the seat bottom 54 (FIG. 8). The second wall 260 prevents the rotation of the second, command arm 46 in the opposite direction.

It will be appreciated that the arm release system 50 can be configured in a different manner to achieve the desired movement of the second, command arm 46 during rotation or swiveling of the seat 12. In this regard, with reference to FIG. 9, an arm release system 300 for use with the seat 12 is shown. As the arm release system 300 is similar to the arm release system 50, the same reference numerals will be used to denote the same or substantially similar components. It should be noted that the assembly of the second, command arm 46 on a right side of the operator (in a forward driving direction of the tractor 10) is merely exemplary, and that the following discussion can apply to a second, command arm 46 that is coupled to a left side of the operator. In the example of a left-hand placement for the second, command arm 46, it will be understood that the corresponding arm release system 300 would be reversed or a mirror image of the right-hand system discussed herein.

The arm release system 300 movably couples the second, command arm 46 to the seat bottom 54 of the seat 12, such that as the seat 12 moves or rotates, the second, command arm 46 is released to pivot such that the second, command arm 46 does not contact the steering wheel 48. While the second, command arm 46 is released and pivoted relative to the seat bottom 54, the second, command arm 46 remains coupled to the seat bottom 54. Thus, the arm release system 300 also enables the second, command arm 46 to be released for rotation relative to the seat bottom 54, while remaining coupled to the seat bottom 54.

In one embodiment, the arm release system 300 includes a linkage 302 and a hinge 304. The linkage 302 is coupled to the swivel assembly 90. In this example, the linkage 302 comprises three links: a first link 306, a second link 307, and a third link 308; however, any number of links can be employed. Generally, each of the first link 306, the second link 307 and the third link 308 is composed of a metal or metal alloy, and is manufacturing by stamping, casting, machining, etc. It should be noted that the rectangular shape of the linkage 302 is merely exemplary, as the linkage 302 can have any desired shape, including, but not limited to, cylindrical. In this example, the first link 306 is coupled to the second swivel plate 94 of the swivel assembly 90 at a first end 306a via the pin P. The first link 306 is coupled to the second link 307 at a second, opposite end 306b via the second pin P2. The second link 307 is coupled to the first link 306 at a third end 307a, via the second pin P2; and is coupled to the third link 308 and the second, command arm 46 at a fourth, opposite end 307b via a third pin P3. Generally, the third pin P3 is received through the third link 308, the second link 307 and is received into the second, command arm 46 to couple the second link 307 and the third link 308 to the second, command arm 46. The third pin P3 is substantially cylindrical, and can be composed of a metal or metal alloy, such as stainless steel. The third link 308 is coupled to the second link 307 at a fifth end 308a, and has a sixth, opposite end 308b that is coupled to the hinge 304. The linkage 302 is generally movable between a first position (FIG. 9), a second position in which the linkage 302 is extended to move the second, command arm 46 away from the seat bottom 54 (FIG. 10) and various positions in between. As will be discussed, based on the rotation of the seat 12 in the direction D, the linkage 302 extends and moves the second, command arm 46 relative to the seat bottom 54.

The hinge 304 couples the second, command arm 46 to the seat bottom 54. In one example, the hinge 304 includes a first hinge portion 310, a second hinge portion 312 and a hinge pin 314. The first hinge portion 310 is coupled to the seat bottom 54, and in one example, comprises a bracket 310*a*, which defines at least one receptacle for the hinge pin 314. The bracket 310*a* of the first hinge portion 310 is coupled to the seat bottom 54 via one or more mechanical fasteners, such as screws, bolts, etc. The receptacle defined by the first hinge portion 310 cooperates with a corresponding receptacle defined by the second hinge portion 312 to receive the hinge pin 314 therethrough. The first hinge portion 310 and the second hinge portion 312 are each composed of a metal or metal alloy, and can be stamped, machined, cast, etc. The second hinge portion 312 includes a bracket 312*a*, which is coupled to the second, command arm 46. In one example, the bracket 312*a* of the second hinge portion 312 is coupled to the second, command arm 46 via one or more mechanical fasteners, such as screws, bolts, etc. The hinge pin 314 is received through the receptacles defined by the first hinge portion 310 and the second hinge portion 312 to enable the second, command arm 46 to move or pivot relative to the seat bottom 54. The third link 308 of the linkage 302 is coupled to the hinge pin 314.

In order to assemble the arm release system 300, with the seat 12 assembled, in one example, the first hinge portion 310 is fixedly coupled to the seat bottom 54, and the second hinge portion 312 is fixedly coupled to the second, command arm 46. The hinge pin 314 is received through the first hinge portion 310, the second hinge portion 312 and the third link 308 to couple the third link 308 to the hinge 304. The first link 306 is coupled to the second swivel plate 94 via the pin P, and the first link 306 is coupled to the second link 307 via the second pin P2. The second link 307 is coupled to the third link 308 and the second, command arm 46 via the third pin P3.

With the arm release system 300 assembled, the operator can sit on the seating surface defined by the seat bottom 54. With the seat 12 in the first position, as shown in FIG. 9, such that the seat bottom 54 is aligned with the axis A, the linkage 302 is in the first position. As the operator rotates the seat bottom 54 in the direction D, toward the second position shown in FIG. 10, the first link 306 moves with the second swivel plate 94 of the swivel assembly 90, causing a corresponding movement of the second link 307, the third link 308 and the second, command arm 46. The linkage 302 moves the second, command arm 46 away from the seat bottom 54 (in a direction D1 generally opposite the direction D).

When the seat bottom 54 is moved back towards the axis A, the linkage 302 moves with the swivel assembly 90 into the first position. As the linkage 302 moves to the first position, the second link 307 moves the third link 308 and the second, command arm 46 towards the seat bottom 54. Once the linkage 302 is in the first position (FIG. 9), the second, command arm 46 is adjacent to the seat bottom 54.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An operator seat for a work vehicle, comprising:
   an operator support rotatably mountable to the work vehicle;
   an arm coupled to the operator support to rotate with the operator support, the arm including at least one human-machine interface device;
   a hinge pivotally connecting the arm to the operator support; and
   a linkage having a first end and a second end, the first end coupled to the operator support, and the linkage configured such that rotation of the operator support in a first direction causes the second end of the linkage to move the arm in a second direction substantially opposite the first direction.

2. The operator seat of claim 1, wherein the operator support includes a seat bottom that rotates relative to a seat base via a swivel assembly, the seat base is fixedly mounted to the work vehicle, and the first end of the linkage is coupled to a swivel plate of the swivel assembly.

3. The operator seat of claim 2, further comprising a bearing coupled to the seat base, with at least a portion of the linkage received through the bearing and movable relative to the bearing.

4. The operator seat of claim 2, further comprising an orbital motion bushing coupled to the seat base, with at least a portion of the linkage received through the orbital motion bushing and the linkage is movable relative to the orbital motion bushing.

5. The operator seat of claim 1, further comprising a latch coupled between the seat bottom and the arm, wherein the movement of the linkage in the second direction releases the latch.

6. The operator seat of claim 1, wherein the hinge further comprises a spring that biases the arm toward the seat bottom.

7. The operator seat of claim 1, wherein the hinge further comprises a first hinge portion coupled to the arm, a second hinge portion coupled to the seat bottom and a detent, with each of the first hinge portion and the second hinge portion including a plurality of teeth that cooperate with a respective one of a second plurality of teeth and a third plurality of teeth defined on the detent, and the engagement between the plurality of teeth, the second plurality of teeth and the third plurality of teeth enables the movement of the arm relative to the seat bottom.

8. The operator seat of claim 7, wherein the hinge includes a hinge pin and a biasing member;
wherein the biasing member resists the rotation of the first hinge portion and the second hinge portion relative to the detent.

9. The operator seat of claim 1, wherein the arm includes a rail defining a channel;
wherein the second end of the linkage is received within the channel to move the arm.

10. The operator seat of claim 1, wherein the arm includes a contact pad;
wherein the second end of the linkage contacts the contact pad to move the arm.

11. The operator seat of claim 1, wherein the second end of the linkage is coupled to the hinge to move the arm.

12. The operator seat of claim 11, wherein the linkage comprises a first link, a second link and a third link;
wherein the second link and the third link are coupled to the arm, and the third link comprises the second end that is coupled to the hinge.

13. An operator seat for a cab of a work vehicle, the cab having one or more operator controls and the seat comprising:
an operator support having a seat base mounted to the work vehicle and a seat bottom rotatably coupled to the seat base by a swivel assembly;
an arm coupled to the operator support to rotate with the operator support, the arm including at least one human-machine interface device;
a hinge pivotally connecting the arm to the operator support; and
a linkage having a first link coupled to the swivel assembly and a second link coupled to the first link, the linkage configured such that rotation of the seat bottom in a first direction causes the first link and the second link to move the arm in a second direction substantially opposite the first direction to inhibit contact between the arm and the one or more operator controls.

14. The operator seat of claim 13, further comprising a bearing coupled to the seat base, with at least a portion of the second link received through the bearing and movable relative to the bearing.

15. The operator seat of claim 13, further comprising an orbital motion bushing coupled to the seat base, with at least a portion of the second link received through the orbital motion bushing and movable relative to the orbital motion bushing.

16. The operator seat of claim 13, further comprising a latch coupled between the seat bottom and the arm, wherein the movement of the second link in the second direction releases the latch.

17. The operator seat of claim 13, wherein the second link is coupled to the hinge to move the arm.

18. The operator seat of claim 17, wherein the linkage comprises a third link coupled to the first link and the second link;
wherein the second link and the third link coupled to the arm.

19. The operator seat of claim 13, wherein the arm includes a rail defining a channel;
wherein an end of the second link is received within the channel to move the arm.

20. The operator seat of claim 13, wherein the hinge further comprises a first hinge portion coupled to the arm, a second hinge portion coupled to the seat bottom and a detent, with each of the first hinge portion and the second hinge portion including a plurality of teeth that cooperate with a respective one of a second plurality of teeth and a third plurality of teeth defined on the detent, and the engagement between the plurality of teeth, the second plurality of teeth and the third plurality of teeth enables the movement of the arm relative to the seat bottom.

* * * * *